United States Patent [19]
Uehara

[11] Patent Number: 5,836,433
[45] Date of Patent: Nov. 17, 1998

[54] WEAR COMPENSATING FRICTION CLUTCH

[75] Inventor: Hiroshi Uehara, Osaka, Japan

[73] Assignee: Exedy Corporation, Japan

[21] Appl. No.: 834,058

[22] Filed: Apr. 11, 1997

[30] Foreign Application Priority Data

Apr. 23, 1996 [JP] Japan .................................. 8-126508

[51] Int. Cl.⁶ .................................................. F16D 13/75
[52] U.S. Cl. .................................. 192/70.25; 192/111 A
[58] Field of Search ........................... 192/70.25, 111 A, 192/70.27, 89.22, 89.23, 89.24

[56] References Cited

U.S. PATENT DOCUMENTS

| | | | |
|---|---|---|---|
| 5,251,737 | 10/1993 | Flotwo | 192/70.25 |
| 5,431,268 | 7/1995 | Mizukami | 192/70.25 |
| 5,450,934 | 9/1995 | Maucher | 192/70.25 |
| 5,586,633 | 12/1996 | Mizukami et al. | 192/70.25 |
| 5,588,517 | 12/1996 | Kooy et al. | 192/70.25 |
| 5,628,389 | 5/1997 | Wittmann et al. | 192/70.25 |
| 5,632,365 | 5/1997 | Maucher | 192/70.25 |
| 5,641,048 | 6/1997 | Von Gaisberg | 192/70.25 |
| 5,727,666 | 3/1998 | Maucher | 192/70.25 |

OTHER PUBLICATIONS

D.A. Davies, BSc; Paper 1. Friction Clutches and Clutch Control Mechanisms; Proc Instn Mech Engrs 1969–70; pp. 1–38; vol. 184 Pt 31.

Primary Examiner—Charles A. Marmor
Assistant Examiner—Saul J. Rodriguez
Attorney, Agent, or Firm—Marshall & Melhorn

[57] ABSTRACT

The diaphragm spring of the friction clutch is provided with a negative spring property region, for providing a spring force required for engaging the clutch disk between the pressure plate and the flywheel, which progressively diminishes with an increase in a clutch release stroke to a level smaller than a spring force provided by the return spring for the pressure plate. Thus, the reaction force applied to the clutch release assembly at the time of partially engaging the clutch is significantly reduced. In particular, this arrangement is highly suitable for incorporating a wear compensating arrangement which comprises a slide ring assembly which urges a support point of thereof abutting the diaphragm spring toward the pressure plate, and a wear detecting member which is frictionally engaged by the clutch cover and thereby restricts a movement of the support point of the slide ring assembly toward the pressure plate, the frictional force being greater than a normal spring force applied by the diaphragm spring but is smaller than a level of the spring force which will be reached when a wear of the clutch disk has progressed and an operating point of the diaphragm spring has shifted to a point of a higher spring load in the negative spring property region.

4 Claims, 5 Drawing Sheets

WEAR COMPENSATING FRICTION CLUTCH

TECHNICAL FIELD

The present invention relates to a friction clutch comprising a diaphragm spring for frictionally engaging a pressure plate with a clutch facing.

BACKGROUND OF THE INVENTION

In a friction clutch, for instance for automotive use, a pressure plate for frictionally engaging a clutch facing is resiliently supported by a clutch cover so as to be urged away from the clutch facing, and the pressure plate is resiliently urged toward the clutch facing by a diaphragm spring when the clutch is engaged. In such a friction clutch, the pressure plate is normally pressed against the clutch facing by the spring force of the diaphragm spring, and the clutch may be disengaged by displacing the diaphragm spring so as to remove the spring force applied to the pressure plate and thereby move the pressure plate away from the clutch facing.

The clutch is disengaged by engaging a central part of the diaphragm spring with a release bearing which is axially actuated by a clutch pedal, and axially moving the central part of the diaphragm spring with the operation of the clutch pedal. The diaphragm spring is pivoted as a result, and this releases the pressure applied to the pressure plate.

As the wear of the clutch facing progresses, the position of the pressure plate for engaging the clutch facing shifts toward the flywheel so that the point of force application by the diaphragm spring to the pressure plate also shifts toward the flywheel, As a result, the amount of deflection of the diaphragm spring when engaging the clutch changes with the progress in the wear of the clutch facing, and the orientation of the diaphragm spring changes from its initial state so that the point of force application by the release bearing to the diaphragm spring also changes.

The diaphragm spring is normally provided with a negative spring constant property in the region where the clutch is released so that the pedal force required for disengaging the clutch may be minimized. For technical details of the diaphragm spring having a negative spring constant property, reference should be made to "Paper 1. Friction Clutches and Clutch Control Mechanisms" D. A. Davies, Proc Instn Mech Engrs, 1969–70, Vol 184 Pt 31. The contents of this publication are hereby incorporated in this application by reference. In terms of clutch release force, the change in the point of force application by the release bearing to the diaphragm spring and the configuration of the diaphragm spring due to the wear of the clutch facing changes the operating point of the diaphragm spring, and this may result in an unacceptable increase in the pedal force required to disengage the clutch.

BRIEF SUMMARY OF THE INVENTION

In view of such problems of the prior art, a primary object of the present invention is to provide a friction clutch comprising a diaphragm spring for selectively engaging a clutch disk which requires a substantially small release force to controlling the partially engaged state of the clutch.

A second object of the present invention is to provide a friction clutch comprising a diaphragm spring which can maintain the operating point of the diaphragm spring substantially fixed without regard to the progress of the wear of the clutch facing.

A third object of the present invention is to provide a friction clutch comprising a diaphragm spring which can maintain the position of the inner periphery of the diaphragm spring substantially fixed without regard to the progress of the wear of the clutch facing so that the pedal stroke may be prevented from changing during use.

A fourth object of the present invention is to provide a friction clutch comprising a diaphragm spring which is simple in structure and economical to manufacture.

According to the present invention, these and other objects can be accomplished by providing a friction clutch, comprising: a clutch cover attached to a flywheel; a diaphragm spring accommodated in a space defined between the flywheel and the clutch cover, and consisting of an annular dish spring which has an outer peripheral part abutting a part of a pressure plate placed between the diaphragm spring and the flywheel, and an inner peripheral part adapted to be actuated by a release assembly; a diaphragm spring support assembly provided on the clutch cover for supporting a point of the diaphragm spring adjacent to the outer peripheral part of the diaphragm spring from a side facing away from the pressure plate; a return spring which urges the pressure plate away from the flywheel; and a clutch disk interposed between the pressure plate and the flywheel so as to be selectively engaged therebetween; wherein the diaphragm spring is provided with a negative spring property region which provides a spring force required for engaging the clutch disk between the pressure plate and the flywheel, the spring force provided by the diaphragm spring progressively diminishing with an increase in a clutch release stroke to a level smaller than a spring force provided by the return spring.

Thus, because the force urging the pressure plate toward the pressure plate essentially consists of the spring forces of the return spring and the diaphragm spring, and the diaphragm spring has a negative spring property which diminishes the spring force thereof with the increase in the clutch pedal stroke, a certain stroke of the clutch pedal causes the two spring forces to balance out, thereby disengaging the clutch. At this point, the reaction force applied to the clutch release assembly is significantly reduced so that the vehicle operator can control the disengaged state of the clutch more easily than was hitherto possible.

Furthermore, this arrangement is highly suitable for incorporating a wear compensating arrangement which comprises a wear compensating means which urges a support point of the diaphragm spring support assembly abutting the diaphragm spring toward the pressure plate; and a wear detecting member which is frictionally engaged by the clutch cover by a frictional force and thereby restricts a movement of the support point of the diaphragm spring support assembly toward the pressure plate, the frictional force being greater than a normal spring force applied by the diaphragm spring but is smaller than a level of the spring force which will be reached when a wear of the clutch disk has progressed and an operating point of the diaphragm spring has shifted to a point of a higher spring load in the negative spring property region.

Thus, as the wear of the clutch disk progresses, the spring load of the diaphragm spring in the rest condition increases because of the shifting of the operating point of the diaphragm spring toward a higher spring load in the negative spring property region. Therefore, actuating the release assembly under such a condition causes the frictional engagement between the wear detecting member and the clutch cover to yield by a distance corresponding to the wear of the clutch disk, and this in turn allows the support point of the diaphragm spring support assembly to move until it reaches a point at which the relative positioning between the pressure plate and the diaphragm spring returns to the initial state. As a result, any wear in the clutch disk is immediately compensated for, and the handling of the clutch in the forms of the required clutch pedal force, the clutch pedal stroke and so forth can be kept substantially constant throughout the service life of the clutch.

According to a preferred embodiment of the present invention, an inner periphery of the clutch cover is provided with a cylindrical wall coaxial with the flywheel, and the wear detecting member comprises an annular member provided with a friction tongue piece frictionally engaging the cylindrical wall. Further, the wear detecting annular member is additionally provided with an abutting tongue piece which restricts movement of the support point of the diaphragm spring support assembly toward the pressure plate.

The wear compensating means comprises a wedge member slidably disposed on the clutch cover, a biasing spring urging the wedge member in a circumferential direction, and a wear compensating member having a wedge surface which cooperates with the wedge member so as to move toward the pressure plate as the wedge member moves along the clutch cover under a spring force of the biasing spring. Preferably, the wedge member and the wear compensating member are arranged on an inner surface of the clutch cover in a coaxially relationship with the clutch cover. This allows a highly compact design of the clutch equipped with a wear compensating arrangement.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
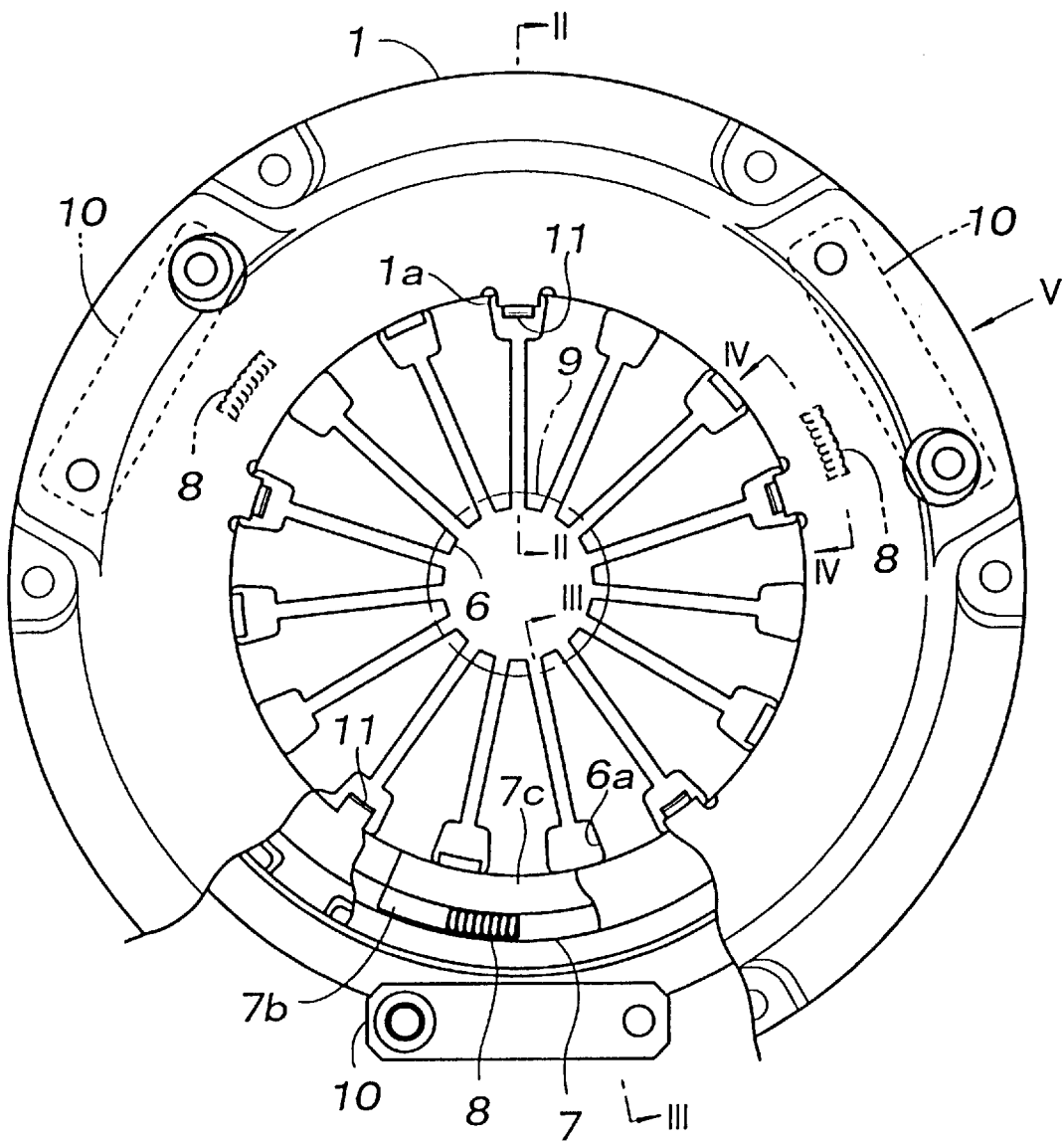
FIG. 1 is a front view of a clutch cover of a friction clutch according to the present invention.
Figure 2:
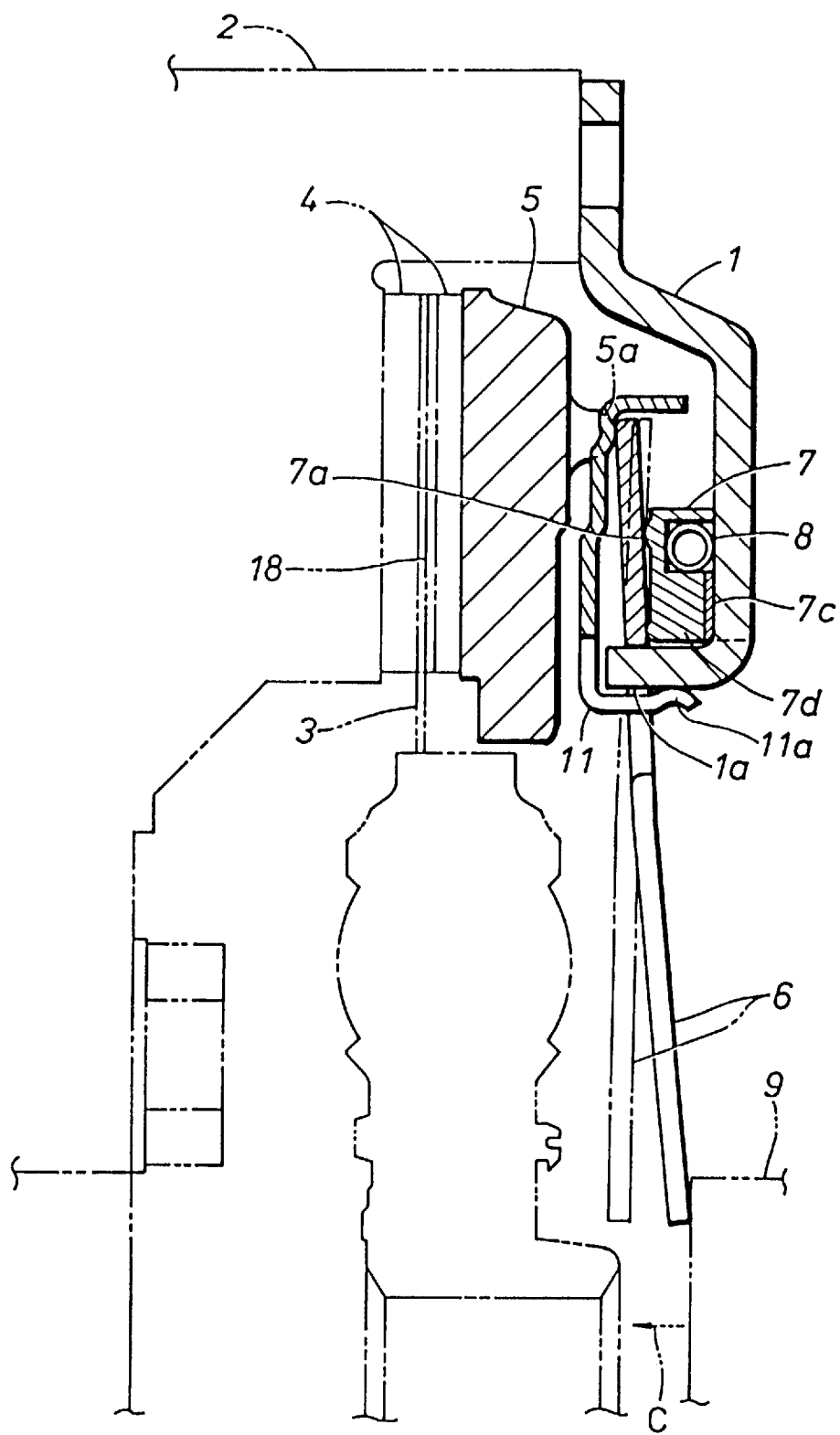
FIG. 2 is a sectional view of an essential part of the friction clutch taken alone line II—II of FIG. 1.

FIG. 1 is an overall front view of a clutch cover 1 of a friction clutch to which the present invention is applied, and FIG. 2 is a sectional side view of an essential part taken along line II—II of FIG. 1. As shown in the drawings, the clutch cover 1 is securely attached to an input end of the flywheel 2, and a space defined between them accommodates a clutch disk 3 including a pair of planar and annular clutch facing members 4 attached to either side thereof, an annular pressure plate 5 for pressing the clutch disk 3 against the flywheel 2, and a diaphragm spring 6 for resiliently biasing the pressure plate 5. The pressure plate 5 is provided with a plurality of projections 5a along an outer peripheral part thereof for engaging an outer peripheral part of the diaphragm spring 6.

The diaphragm spring 6 includes a plurality of comb-shaped tongue pieces formed by cutting out a plurality of radial slots from an inner periphery of the dish spring at an equal angular interval. The forward or inner end of each of the radial slots of the diaphragm spring 6 defines an opening 6a which is more laterally extended than the remaining part of the radial slot.

Figure 3:
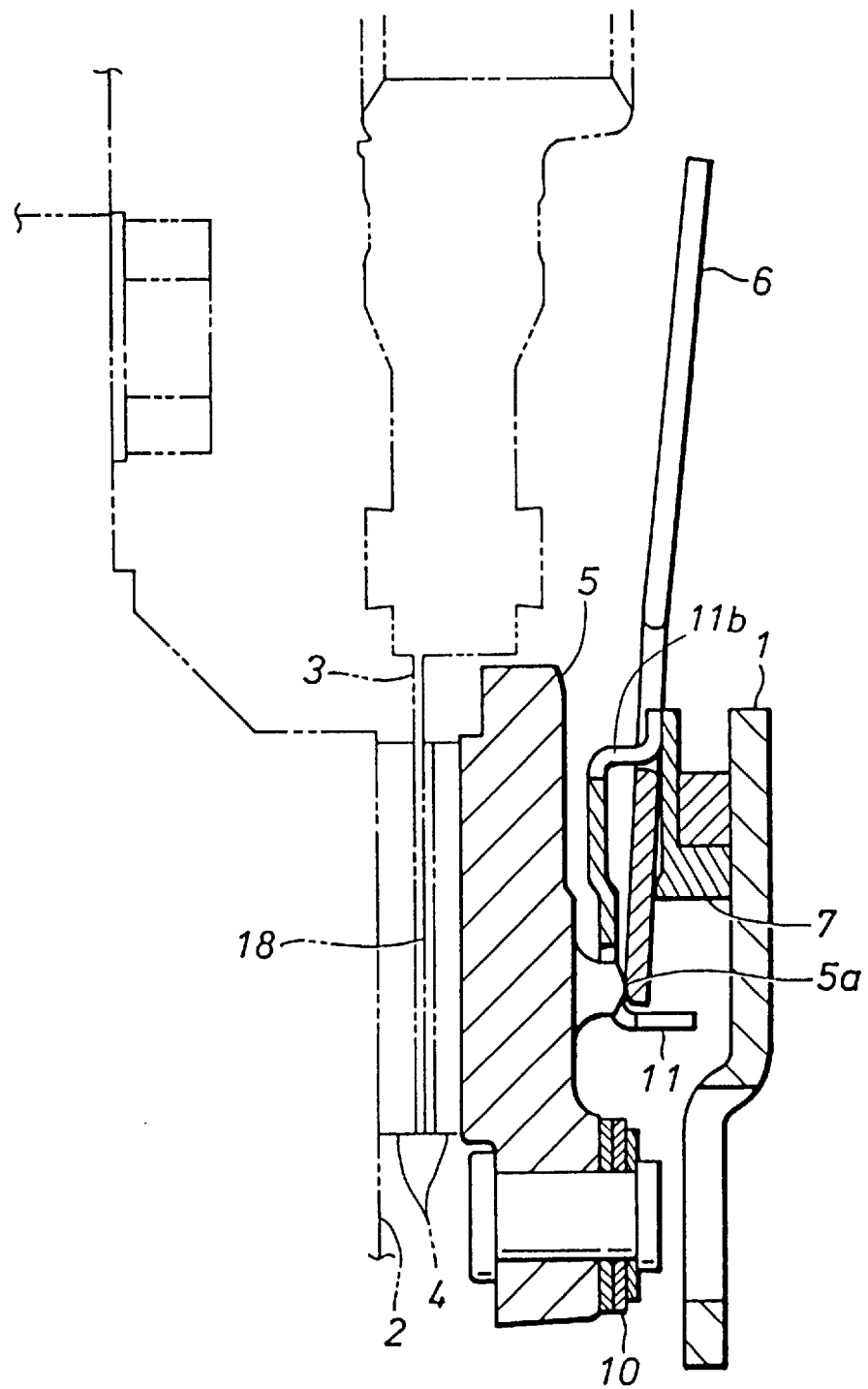
FIG. 3 is a sectional view of an essential part of the friction clutch taken along line III—III of FIG. 1.
Figure 4:
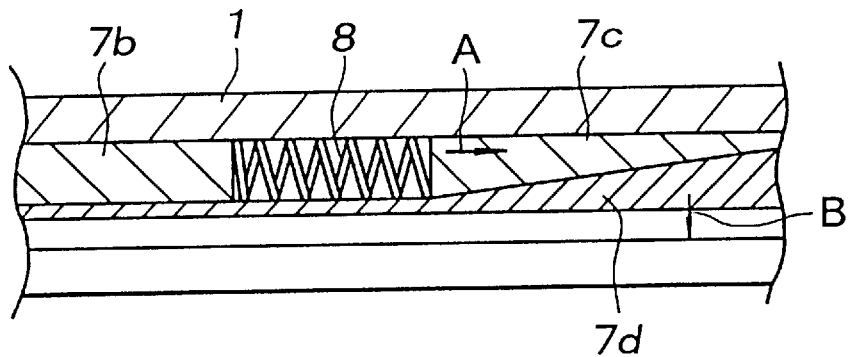
FIG. 4 is an enlarged sectional view of an essential part of the friction clutch as seen from arrow IV of FIG. 1.

An annular slide ring assembly 7 is interposed between the diaphragm spring 6 and an inner surface of an end plate of the clutch cover 1. The side of the slide ring assembly 7 facing the pressure plate 5 includes an annular projection serving as a support portion 7a for the diaphragm spring 6. The support portion 7a abuts a radially intermediate point of the diaphragm spring 6 from a side facing away from the pressure plate 5 as illustrated in FIGS. 2 and 3. As best illustrated in FIG. 4, the slide ring assembly 7 comprises a plurality of fixed ring sections 7b which are securely and coaxially attached to the clutch cover 1, a plurality of movable wedge sections 7c which are each arranged in a gap between adjacent ring sections 7b along a common circle, and urged circumferentially by biasing springs 8 in the direction indicated by arrow A, and a compensation ring 7d which is placed coaxially over the fixed ring sections 7b and the moveable wedge sections 7c and is provided with wedge surface sections for cooperation with the corresponding wedge surfaces of the moveable wedge sections 7c. The biasing springs 8 are each interposed between a corresponding pair of the moveable wedge section 7c and the fixed ring section 7b so that the biasing springs 8 normally urge the moveable wedge sections 7c circumferentially so as to urge the compensation ring 7d, which is prevented from circumferential movement by means not shown in the drawings, away from the clutch cover 1, by virtue of the cooperation between the moveable wedge sections 7c and the corresponding wedge surface sections of the compensation ring 7d. The aforementioned annular projection or the diaphragm spring support portion 7a is integrally formed in the compensation ring 7d.

The free ends of the comb shaped tongue pieces defined along the inner periphery of the diaphragm spring 6 are adapted to engage a release bearing 9. The pressure plate 5, in its installed state, is resiliently biased by the outer periphery of the diaphragm spring 6 so as to achieve the engaged state of the clutch as illustrated in FIG. 2.

Figure 5:
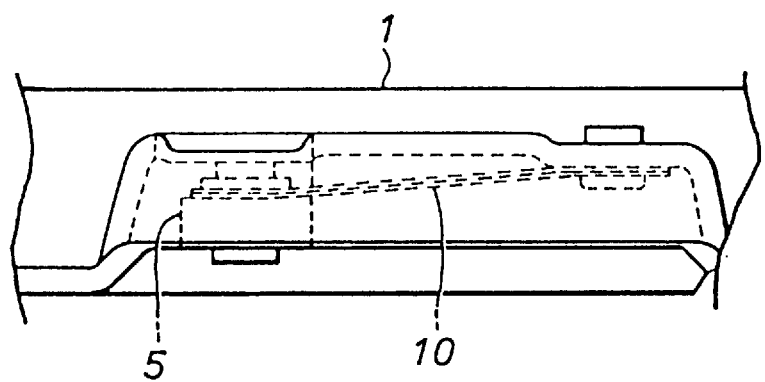
FIG. 5 is an enlarged sectional view of an essential part of the friction clutch as seen from arrow V of FIG. 1.

The pressure plate 5 is supported by the clutch cover 1 via return springs 10 consisting of sheet springs placed tangentially at three locations along the periphery of the pressure plate 5 (see FIG. 5) so as to be resiliently urged away from the clutch disk 3. When the clutch pedal is operated so as to axially actuate the release bearing 9, the diaphragm spring 6 initially pivots around the projections 5a of the pressure plate 5, and a gap is produced between the support portion 7a of the slide ring assembly 7 and the diaphragm spring 6. As the clutch release operation further progresses, the spring force of the return springs 10 overcomes the spring force of the diaphragm spring 6 which progressively diminishes as the clutch pedal is pressed further down by virtue of the negative spring property of the diaphragm spring 6; causing the pressure plate 5 to move away from the clutch disk 3. As a result, the diaphragm spring 6 moves toward the clutch cover 1 until the gap at the support portion 7a is filled by the receding movement of the diaphragm spring 6 so that the clutch disk 3 is disengaged from the flywheel 2 and the clutch is disengaged.

Thus, according to this embodiment, the clutch is disengaged under the spring force of the return springs 10 when the diaphragm spring 6 is deflected to such an extent that its spring load diminishes below the spring load of the return springs 10 by virtue of the negative spring property of the diaphragm spring 6, as opposed to more conventional friction clutches in which the diaphragm spring 6 pivots around a fulcrum point. formed in the clutch cover thereby removing the pressure applied to the pressure plate by the diaphragm spring.

An annular wear detecting member 11 made of sheet metal, and having a C-shaped cross section is interposed between the diaphragm spring 6 and the pressure plate 5. The clutch cover 1 is provided with a plurality of tongue pieces 1a which are bent from the material of the clutch cover 1 along the inner periphery thereof and extend axially toward the pressure plate 5. One leg of the C-shaped wear detecting member 11 is provided with a plurality of friction tongue pieces 11a which slidably and frictionally engage the side surfaces of the corresponding tongue pieces 1a under the resilient spring force of the material of the wear detecting member 11. Referring to FIG. 3, the one leg of the C-shaped wear detecting member 11 is also provided with abutting tongue pieces 11b which alternate with the friction tongue pieces 11a along the inner periphery of the C-shaped wear detecting member 11 and abut the side of the compensation ring 7d facing the pressure plate 5.

The clutch disk 3 is formed by interposing a steel disk with a pair of facing members 4 as mentioned earlier, and a wave spring 18 is interposed between the two facing members 4 so that the handling of the clutch at the time of partially engagement may be improved.

Figure 6:
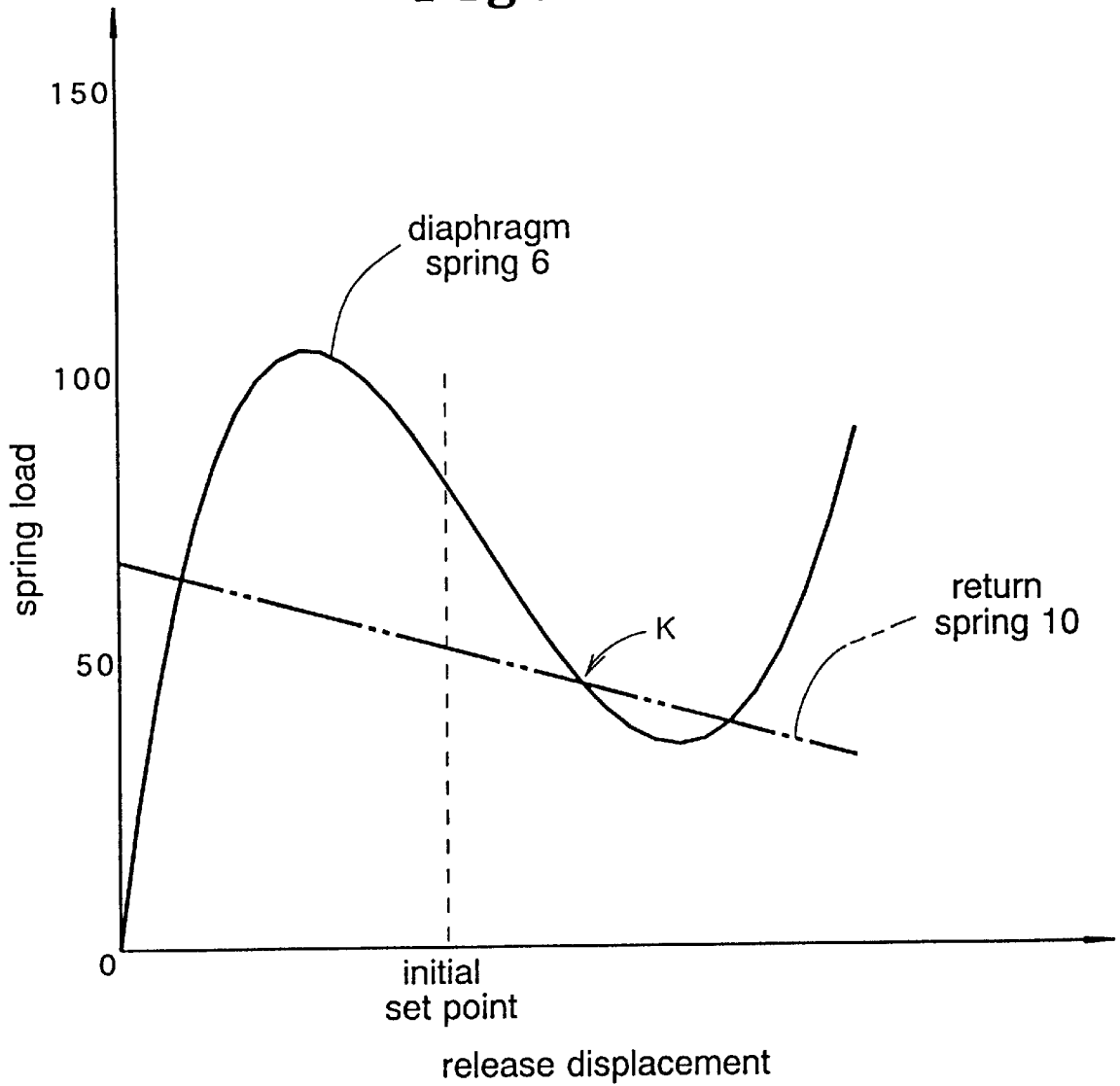
FIG. 6 is a graph showing the spring property of the diaphragm spring.

In this friction clutch which was described above, the initial set position is selected such that the release point is at a relatively high release load point of a negative spring property region of the diaphragm spring 6 as indicated in the graph of FIG. 6. When the release bearing 9 is actuated as indicated by arrow C of FIG. 2 to disengage the clutch, the biasing force of the diaphragm spring 6 acting upon the pressure plate 5 diminishes with the progress of the pedal stroke. The property of the return springs 10 is selected such that the spring force of the return springs 10 crosses an intermediate region of the negative spring property region of the diaphragm spring 6 as indicated by point K in FIG. 6.

Thus, according to the present embodiment, by taking advantage of the reduction in the release load owing to the use of the negative spring property of the diaphragm spring, once the biasing force of the diaphragm spring falls below the spring force of the return springs 10 as a result of a certain pedal stroke, the return springs 10 can move the pressure plate 5 away from the clutch disk 3 with the balance of the spring force remaining from overcoming the spring force of the diaphragm spring 6. According to this embodiment, the pressure plate 5 is not moved away from the clutch disk 3 by the pivoting of the diaphragm spring 6 around a point in the clutch cover 1 as opposed to more conventional clutches using a diaphragm spring. Therefore, the biasing force acting upon the pressure plate 5 is reduced to zero at the point of intersection K, and the semi-engaged state is thereby produced so that the force acting upon the release bearing 9 is free from the influences of the strong reaction which is present in the diaphragm spring of the conventional arrangement, and the vehicle operator can favorably control the semi-engaged state of the clutch.

According to this embodiment, when the wear of the facing members 4 of the clutch disk 3 progresses, the wear detecting member 11 shifts toward the pressure plate 5 against the frictional force retaining the wear detecting member 11 to the clutch cover 1 by being pushed by the diaphragm spring 6 by a distance corresponding to the amount of the wear because of the increase in the spring load of the diaphragm spring 6 which in turn results from the shifting of the operating point of the diaphragm spring 6 under the rest condition to the left in the graph of FIG. 6, and a corresponding gap is created between the abutting tongue pieces 11b and the compensation ring 7d. This removes the constraint on the adjusting action of the slide ring assembly 7.

Therefore, when the clutch is released under this condition, as the clutch pedal is operated to release the clutch, a gap is produced between the diaphragm spring support portion 7a and the diaphragm spring 6. This gap is filled immediately by the axial movement of the compensation ring 7d resulting from the circumferential movement of the wedge members 7c under the spring force of the biasing springs 8. Thus, any wear which may develop in the clutch disk 3 can be immediately compensated for by the changing of the position of the diaphragm spring support portion 7a by a corresponding distance.

According to this embodiment, the relative positions of the pressure plate 5 and the support portion 7a defined between the diaphragm spring 6 and the slide ring assembly 7 remain fixed without regard to the progress of wear. Therefore, the wear in the clutch facing would not change the spring force of the diaphragm spring 6 applied to the pressure plate 5, and the handling of the clutch is significantly improved because the necessary pedal force remains fixed even after long use.

The point K is determined at the time of initially installing the clutch, and would not be affected by the change in the orientation of the diaphragm spring 6 due to the wear of the clutch facing. Therefore, the release load at the time. of disengaging the pressure plate 5 from the clutch disk 3 and the pedal stroke required to disengage the clutch remain constant without regard to the progress of wear.

Thus, according to the present invention, because the relative positions of the pressure plate and the diaphragm spring are fixed without regard to the progress of wear of the clutch facing, the pressure applied to the pressure plate by the diaphragm spring is not affected by the progress of wear. Therefore, the clutch can be operated over its entire service life without causing any substantial change in the pedal force required to engage and disengage the clutch.

Although the present invention has been described in terms of preferred embodiments thereof, it is obvious to a person skilled in the art that various alterations and modifications are possible without departing from the scope of the present invention which is set forth in the appended claims.

What we claim is:

1. A friction clutch, comprising:
    a clutch cover attached to a flywheel, said clutch cover having an inner periphery provided with a cylindrical wall coaxial with said flywheel;
    a diaphragm spring accommodated in a space defined between said flywheel and said clutch cover, and consisting of an annular dish spring which has an outer peripheral part abutting a part of a pressure plate placed between said diaphragm spring and said flywheel, and an inner peripheral part adapted to be actuated by a release assembly;
    a diaphragm spring support assembly provided on said clutch cover for supporting a point of said diaphragm spring adjacent to said outer peripheral part of said diaphragm spring from a side facing away from said pressure plate;
    a wear compensating means which urges a support point of said diaphragm spring support assembly abutting said diaphragm spring toward said pressure plate;

a wear detecting member having an annular member provided with a friction tongue piece frictionally engaging said cylindrical wall of said clutch cover to thereby restrict a movement of said support point of said diaphragm spring support assembly toward said pressure plate;

a return spring which urges said pressure plate away from said flywheel; and a clutch disk interposed between said pressure plate and said flywheel so as to be selectively engaged therebetween;

wherein said diaphragm spring is provided with a negative spring property region which provides a spring force required for engaging said clutch disk between said pressure plate and said flywheel, said spring force provided by said diaphragm spring progressively diminishing with an increase in a clutch release stroke to a level smaller than a spring force provided by said return spring, and said frictional force being greater than a normal spring force applied by said diaphragm spring but smaller than a level of said spring force which will be reached when a wear of said clutch disk has progressed and an operating point of said diaphragm spring has shifted to a point of a higher spring load in said negative spring properly region.

2. A friction clutch according to claim 1, wherein said wear detecting annular member is additionally provided with an abutting tongue piece which restricts movement of said support point of said diaphragm spring support assembly toward said pressure plate.

3. A friction clutch according to claim 1, wherein said wear compensating means comprises a wedge member slidably disposed on said clutch cover, a biasing spring urging said wedge member in a circumferential direction, and a wear compensating member having a wedge surface which cooperates with said wedge member so as to move toward said pressure plate as said wedge member moves along said clutch cover under a spring force of said biasing spring.

4. A friction clutch according to claim 3, wherein said wedge member and said wear compensating member are arranged on an inner surface of said clutch cover in a coaxially relationship with said clutch cover.

* * * * *